E. J. BLAKE.

LIGHT SIGNAL.

APPLICATION FILED MAY 26, 1920.

Reissued Aug. 31, 1920.

14,940.

3 SHEETS—SHEET 1.

INVENTOR

Eli J. Blake

BY Oscar S. Field

ATTORNEY

E. J. BLAKE.

LIGHT SIGNAL.

APPLICATION FILED MAY 26, 1920.

Reissued Aug. 31, 1920. 14,940.

3. SHEETS—SHEET 2.

INVENTOR

Eh. J. Blake

BY Oscar S. Field

ATTORNEY

E. J. BLAKE.

LIGHT SIGNAL.

APPLICATION FILED MAY 26, 1920.

Reissued Aug. 31, 1920. 14,940.

3 SHEETS—SHEET 3.

INVENTOR

Eh. J. Blake

BY Oscar S. Fields

ATTORNEY

UNITED STATES PATENT OFFICE.

ELI J. BLAKE, OF BUFFALO, NEW YORK, ASSIGNOR TO HALL SWITCH & SIGNAL CO., A CORPORATION OF MAINE.

LIGHT-SIGNAL.

14,940. Specification of Reissued Letters Patent. Reissued Aug. 31, 1920.

Original No. 1,279,638, dated September 24, 1918, Serial No. 178,720, filed July 5, 1917. Application for reissue filed May 26, 1920. Serial No. 384,478.

*To all whom it may concern:*

Be it known that I, ELI J. BLAKE, a citizen of the United States, and a resident of Buffalo, county of Erie, State of New York, have invented certain new and useful Improvements in Light-Signals, of which the following is a specification.

It has been the practice heretofore to build railroad signals of two distinctive classes, one being of the type known as semaphore signals comprising a moving element adapted to give a position indication and the other consisting of a light signal by means of which indications are given by either changing the color or some other physical property of the beams of light emitted by the signal.

It is the object of the present invention to provide a light signal which will overcome the defects encountered in the types of signals now in use. One object being to provide a single light signal which is adapted to change its color or other characteristic indications with a minimum consumption of energy.

Another object is to provide a signal of extreme simplicity in operation and which has small light movable members which are practically free from mechanical wear.

A further object is to provide a light signal which will employ only one source of light and one emitting surface or area, but which will nevertheless change the character of the rays of light emitted to give the necessary indications.

A further object is to provide a light signal in which it is possible to use a reflector thereby retaining a maximum utilization of the light emitted from the source without the danger of reflected light from extraneous sources giving false indications.

Another object is to provide a signal which will have controlling contacts and which will be adapted to operate direct from a feeble source of power such as a track circuit and thereby obviate the use of local sources of power and circuits.

Other features and valuable objects of the invention will be clearly understood from the accompanying specification and from the appended claims.

Referring to the drawings in Figure 1 I show a front elevation of a preferred form of mechanism suitable for the operation of my invention.

By reference to the drawings, the fundamental idea of my invention immediately becomes apparent, consisting broadly in arranging a concentrated light emitting surface in connection with suitable reflectors or lenses, bringing the rays to a concentrated point and then allowing them to diverge to cover the diameter of a suitable light emitting surface which emits the rays in an approximately parallel beam or at any suitable angle, thereby enabling a comparatively small and light filter or filters to be efficiently operated at or near the focal point to control the character of the rays emitted from the relatively large light emitting surface such as an objective lens.

Figure 5:
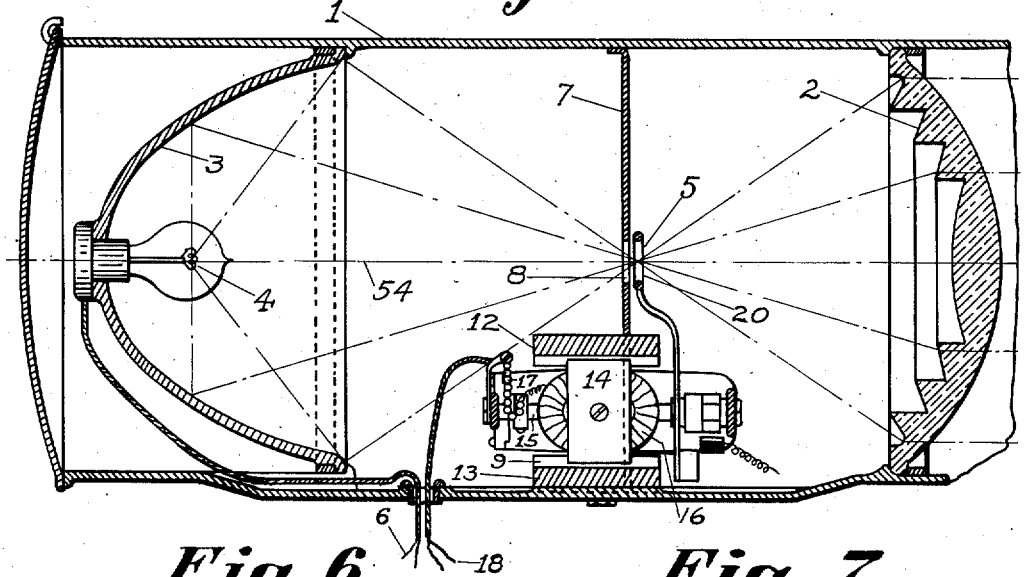
Fig. 5 is a cross section showing one form of construction of a complete signal.
Figure 9:
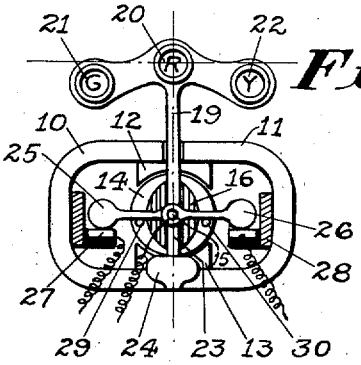
Fig. 9 shows a front view of the operating mechanism shown in Fig. 5.

Referring to Figs. 5 and 9 the operation of the device is as follows:

An outer casing 1 is provided at its front end with an objective lens 2 and at the rear end with a reflector 3 and a light 4 so disposed with relation to the reflector 3 that a large percentage of the rays emitted from light 4 will be intercepted by the reflector 3 and caused to converge to a conjugate focal point 5 and then diverge in order to cover the surface of the objective lens 2. It will be seen that by so relatively disposing the reflector 3, light 4 and objective lens 2, practically all the light reflected may be caused to pass through the conjugate focal point 5 and then diverge so that it will just cover the objective lens 2 which may be of any suitable type and of such a focus as to either bring the rays into parallel relation or so change the angle of divergence to give the desired covering power for any track conditions. The lamp 4 may be operated with energy through wires 6 from any suitable source. Adjacent the focal point 5 a screen 7 is arranged with an aperture 8 adapted to coincide with the focal point 5, this aperture being made as small as possible without interfering with the reflected rays which pass from the reflector through the focal point. The object of this screen is to stop passage of direct rays from the light 4 to the objective lens 2 without passing through the filters.

In the 3 position signal an operating mechanism 9 is provided which is adapted to assume two distinctive energized positions and a neutral deënergized danger position. The device shown in Figs. 5 and 9 for this purpose comprises an operating mechanism of a three position direct current motor relay. Permanent magnets 10 and 11 are arranged with their respective like poles adjoining iron pole pieces 12 and 13 thereby creating a field of flux between the poles 12 and 13, in which an armature 14 is adapted to rotate. Armature 14 is mounted upon a spindle 15 and provided with a simple winding 16 as shown. Flexible connections 17 are provided to convey the current from a controlling source through wires 18 to the winding 16. The shaft 15 has rigidly attached to it a filter carrying arm 19, carrying respectively red, green and yellow filters as shown at 20, 21 and 22 and also a downwardly extended arm 23, provided with a counter balance weight 24 adapted to balance the weight of the filters 20, 21 and 22. Loosely carried on the shaft 15 are two counterweights 25 and 26, which rest on insulated metal plates 27 and 28 which act as stops for the same. The armature 14 is provided with pins 29 and 30 adapted to engage the counterweights 25 and 26. The operation of the mechanism is as follows:

Current may be continuously applied at 6 to maintain light 4 burning as this light need never be extinguished. When no current is applied at 18, thereby leaving the armature 14 deënergized, the counterweights 25 and 26 rest against plates 27 and 28 respectively and also against pins 29 and 30, thereby holding the armature 14 in a central position, and arm 19 in a perpendicular position, in which condition the red filter 20 will coincide with the aperture 8 at the focal point 5. It will be seen that the rays from the light 4 passing through the conjugate focal point 5 will have to pass through the red filter 20 which will filter the rays and only allow the red portion of the rays to reach the object lens 2, thereby giving a red signal indication. Upon energy being applied at 18 in a certain direction, the armature 14 will be energized and caused to rotate in a counter clockwise direction. The pin 30 will engage the weight 26 and raise the same against gravity, causing the arm 19 to move toward the left thereby removing the red filter 20 and placing the yellow filter 22 opposite lens 2 to give a yellow light signal indication. Upon the energy being discontinued at 18 the color of the rays will be again changed to red and upon energy being applied at 18 in a reverse direction the color of the indication will be changed as heretofore described to green. The counterweights 25 and 26 as shown may be caused to break circuits between their respective contact plates 27 and 28 and thereby control any other circuits desirable.

By providing the mechanism with contacts in this manner it will be seen that this signal may be installed in place of the relays now employed to control the signals.

Figure 1:
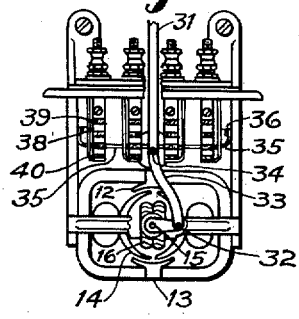
Figure 10:
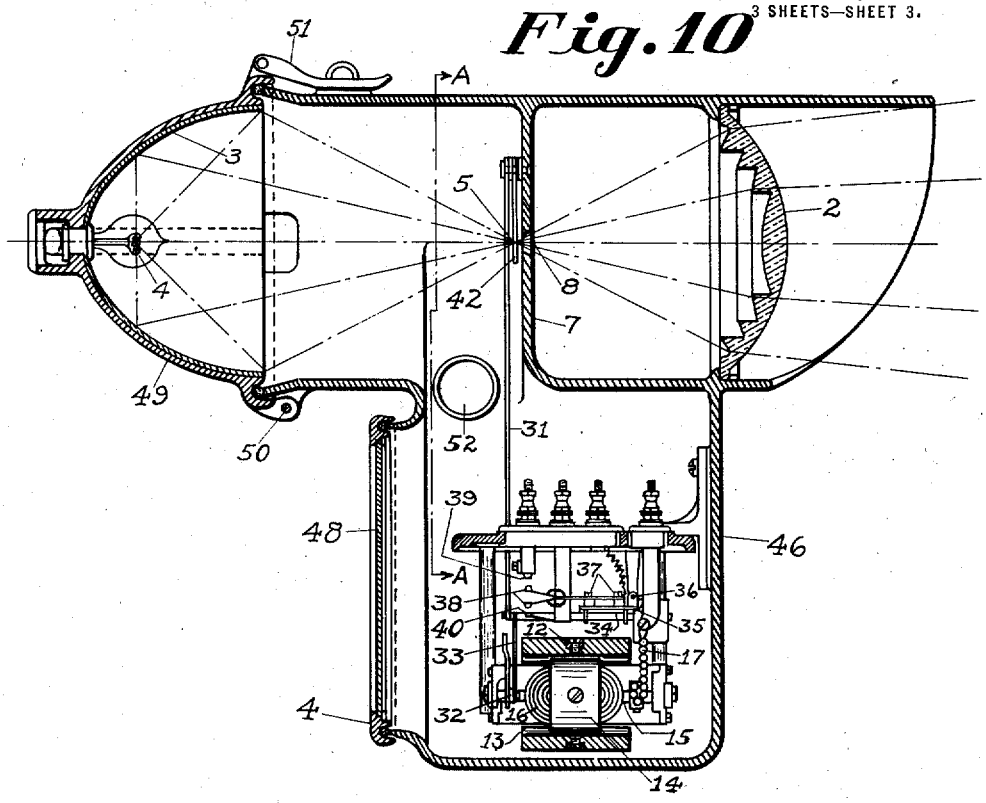
Fig. 10 is a section of a modified arrangement of my invention showing the same being operated directly by means of a standard three position track relay.
Figure 11:
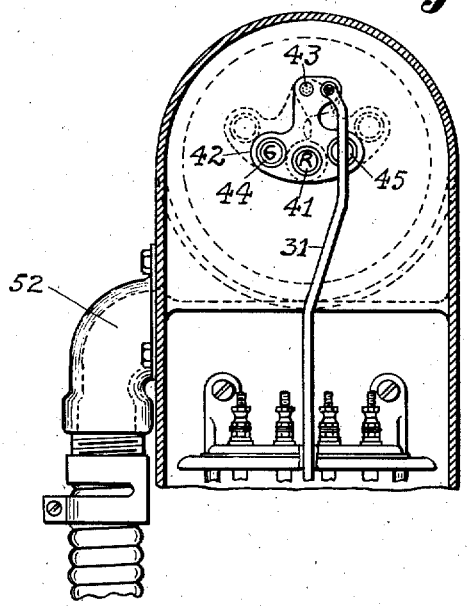
Fig. 11 is a section through A A in Fig. 10, showing the light filters and method of operating the same.

Figs. 1, 10 and 11 show a modified form of the signal in which the operating mechanism is placed below the case containing the light and in which the filters are operated by means of a connecting rod 31. The mechanism disclosed in this drawing comprises what is known as a three position relay and the operating mechanism is identical to that shown in Fig. 9. The shaft 15 is provided with a crank pin 32 which will impart either an upward or downward movement to the connecting link 33 in accordance with the direction of rotation of the armature 14 from its neutral central position operating arm 34 and connection rod 31 accordingly. Arm 34 is connected to the plate 35 which is pivoted at points 36. On the opposite side of this plate, mounted on insulated studs 37, contact fingers 38 are carried which coöperate with the front contacts 39 and back contacts 40. Connecting rod 31 connects arm 34 to the filter changing member 42. The mechanism as shown in the drawing is in the neutral or deënergized position. The red filter 41 being opposite the aperture 8 at the conjugate focal point 5. It will be seen that upon the operation of this mechanism the contacts 39 and 40 will be opened and closed according to the direction of current flowing in the armature and the connecting rod 31 will cause the filter carrying members 42 to oscillate about pivot 43 and either place the green filter 44 or yellow filter 45 opposite the aperture 8 as described her ofore.

The mechanism can be carried in a suitable case 46 which may be provided with a door 47 and an inspection glass 48 thereby allowing the maintainer to inspect the contacts of the mechanism without interfering with the operation of the signal. The reflector 3 and light 4 may also be mounted in a suitable cover 49 which will swing open on a pivot 50 and may be latched closed by means of a hasp 51; this enabling easy access to the reflector 3 for cleaning and to the light 4 for replacements should the same burn out. At 52 a suitable lead is provided for carrying all the connecting wires through for the operation of the signal. In other details this form of the signal is identical to that shown in Fig. 5.

Figure 6:
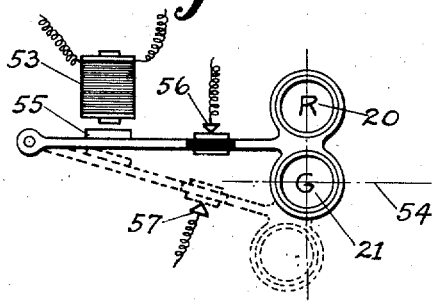
Fig. 6 shows diagrammatically a simple means for operating the signal.

Fig. 6 shows how the filters 20 and 21 may be operated by means of a simple electromagnet 53. The axis of the conjugate focal point is shown at 54 and it will be seen that upon energization or deënergization of the magnet 53 it will either attract or release its armature 55 thereby moving the red or green filter into the conjugate focal point and also opening and closing contacts 56 and 57 for the control of other circuits.

Figure 7:
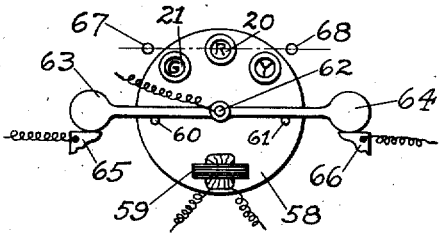
Fig. 7 shows a means for operating the signal inductively by alternating current.

Fig. 7 shows diagrammatically a method whereby the signal may be controlled by means of alternating current. An aluminum disk 58 is acted upon by a two phase alternating current magnet 59 to cause the disk 58 to rotate either clockwise or counter clockwise according to the relative direction of the energy in the respective phases in a manner well known in the art. The disk 58 is provided with two pins 60 and 61 and rotates upon a spindle 62. Loosely mounted on the spindle 62 are counterweights 63 and 64 so arranged that normally they will rest upon metallic stops 65 and 66 and also pins 60 and 61, thereby retaining the disk 58 in the central position with the red filter 20 at the focal point. It will be seen that if the disk 58 has been caused to rotate in either one direction or the other it will either raise counterweights 63 or 64 against gravity until it engages with its respective stop pin 67 or 68 thereby giving a green or yellow light indication. When either counterweights 63 or 64 rise they will break circuit with their metallic stops 65 or 66 thereby controlling other electrical circuits.

Figure 8:
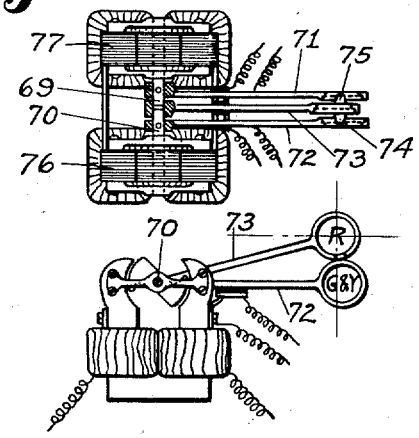
Fig. 8 shows an operating mechanism for the signal which may be operated by either direct or alternating current.

In Fig. 8 I have shown a method of operating my signal which comprises a combination of two Z type mechanisms. The mechanisms are placed side by side with their spindles 69 and 70 in alinement. Rigidly attached to the spindles are filter carrying arms 71 and 72 and loosely mounted between these is a filter carrying arm 73. On the under side of the red filter carried by arm 73 are two projections 74 and 75. When the Z type mechanism 76 is operated to rotate spindle 70 in a counter clockwise direction it will raise arm 72, thereby elevating the green filter into the conjugate focal point. This filter will engage with the projection 74 and push the red filter carried on arm 73 out of the focal point. When the mechanism is deënergized both filters are allowed to fall, leaving the red filter in the position to give a red indication as before. Upon energization of the Z mechanism 77 the yellow filter will replace the red filter in like manner by engaging with projection 75.

Figure 2:
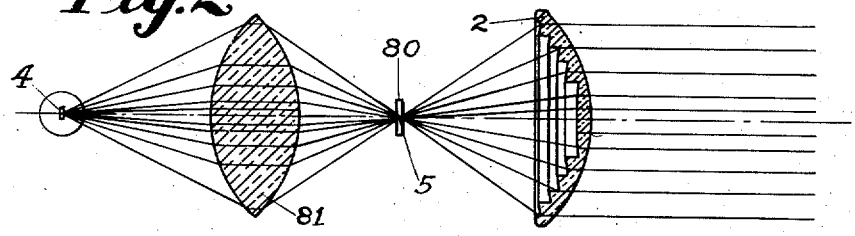
Fig. 2 is a diagrammatical representation showing means for concentrating the light rays to a conjugate focal point by means of a suitable lens.
Figure 3:
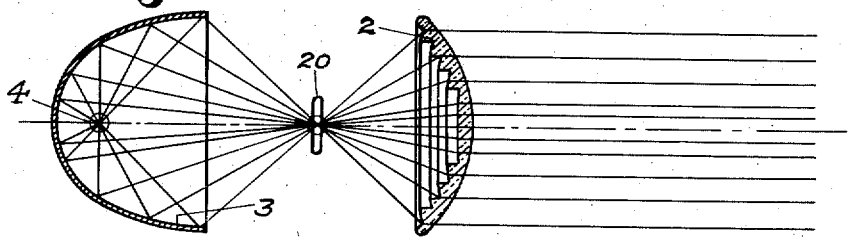
Fig. 3 shows my light signal employing a parabolic reflector for the concentration of the light rays, and a suitable objective lens.
Figure 4:
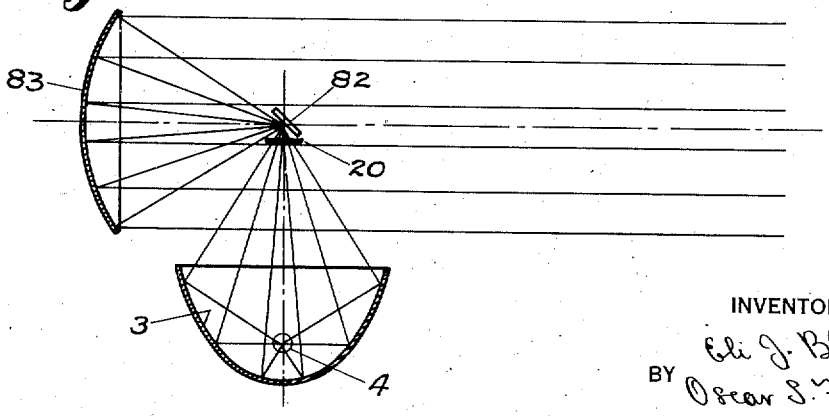
Fig. 4 shows an adaptation of my invention employing reflectors entirely in its operation.

Figs. 2, 3 and 4 show diagrammatically possible combinations utilizing my invention.

In Fig. 2 I focus the source of light through a conjugate focal point 5 in which point the filter 80 is operated by means of a suitable lens 81; the light diverging to cover the objective lens 2 and to be converted into suitable indication giving rays.

In Fig. 3 I show diagrammatically the embodiment which I have described in connection with Figs. 5 and 10. In Fig. 4 I have shown the reflector 3 placed below the signal indication aperture. The rays in this case are brought to a conjugate focal point upon a small mirror 82, the filter 20 being arranged to operate as nearly as possible at the conjugate focal point to control the color of the rays. The rays are reflected by means of the mirror 82 on to a second concave reflector 83 which reflects the rays forward in a parallel beam to give the signal indication.

It will be understood that in the signal as above described any form of illuminating unit, such as an oil light, gas light, etc., may be used and that the term conjugate focal point is used to indicate an approximate point as it is well known in the art that an absolute point cannot be obtained.

It will further be understood that the filters may be operated in any desirable manner either manually, pneumatically, mechanically or by any other means.

I do not wish to be restricted to the particular embodiments of the invention as disclosed but wish to cover the fundamental principle of the invention, which may be constructed in a variety of different manners to accomplish the same purpose.

What I claim is:

1. In a light signal, a source of light, means for concentrating a large percentage of the rays emitted by said source to a conjugate focal point in advance of the original source, color filters adjacent said focal point to modify the character of the rays passing through the focal point, operating means for selectively moving said color filters into the path of the rays, and means interposed in the path of the rays diverging from said focal point to change the path of the modified rays.

2. In a light signal, a source of light, means for concentrating a large percentage of the rays emitted by said source to a conjugate focal point in advance of the original source, color filters adjacent said focal point to modify the character of the rays passing through the focal point, operating means for selectively moving said color filters into the path of the rays, means interposed in the path of the rays diverging from said focal point to change the path of the modified rays, and a screen adapted to prevent direct rays from the original source of light from impinging upon the last said means.

3. In a light signal, a source of light, means for concentrating a large percentage of the rays emitted by said source to a conjugate focal point in advance of the original source, color filters adjacent said focal point to modify the character of the rays passing through the focal point, contacts, operating means for selectively moving said color filters into the path of the rays, and for operating said contacts, and means interposed in the path of the rays diverging from said focal point to change the path of the modified rays.

4. In a light signal, a source of light, means for concentrating a large percentage of the rays emitted by said source to a conjugate focal point in advance of the original source, color filters adjacent said focal point to modify the character of the rays passing through the focal point, contacts, operating means for selectively moving said color filters into the path of the rays, and for operating said contacts, means interposed in the path of the rays diverging from said focal point to change the path of the modified rays, and a screen adapted to prevent direct rays from the original source of light from impinging upon the last said means.

5. In a light signal, a mechanism case, a concentrated source of light contained in said case, a reflector adapted to bring a large percentage of the rays emitted from said source to a conjugate focal point in advance of the original source, an opaque screen having an aperture for the passage of rays at the conjugate focal point, filters adjacent said focal point to modify the character of rays passing through the focal point, operating mechanism in said case to selectively interpose said filters into the path of the rays, and a lens interposed in the path of the rays diverging from said focal point to change the modified rays into nearly parallel rays.

6. In a light signal, a mechanism case, a concentrated source of light contained in said case, a reflector adapted to bring a large percentage of the rays emitted from said source to a conjugate focal point in advance of the original source, an opaque screen having an aperture for the passage of rays at the conjugate focal point, filters adjacent said focal point to modify the character of rays passing through the focal point, contacts, operating mechanism in said case to selectively interpose said filters into the path of the rays, and adapted to operate said contacts, and a lens interposed in the path of the rays, diverging from said focal point to change the modified rays into nearly parallel rays.

7. In a light signal, a concentrated source of light, means to cause a large percentage of rays emitted from said source to converge at a second point of concentration to increase the relative intensity of the light within a certain angle of dispersion, means to selectively modify the characteristics of said rays adjacent the second point of concentration and means to change the angle of dispersion of the modified rays.

8. In a light signal, a concentrated source of light emitting rays at a greater angle than 180°, means for causing a large percentage of the rays emitted to pass through a second point of concentration and to disperse at a relatively smaller angle, means to modify the characteristics of the rays adjacent the second point of concentration, and means to intercept the modified rays to give a larger light emitting surface than at the second point of concentration.

9. In combination, a source of light, means for condensing light rays emitted from said light at a focal point, color filters adjacent said focal point, one of which is biased to move to said focal point by gravity, and energy consuming means for moving a second filter to said focal point and maintaining it at said focal point so long as energy is being consumed.

10. In combination, a source if light, means for condensing rays of light from said source at a focal point, a plurality of color filters, means for selectively moving one color filter or another into position at said focal point so that the rays of light at that point may pass through it, and means for changing the direction of the light rays after they have passed through the color filter.

11. In combination, a single source of light and means for condensing rays of light from said source at a focal point, a plurality of small and light weight color filters adjacent said focal point one of which is biased to move to said focal point by gravity, and through which the focalized rays pass, means requiring a small consumption of energy for selectively moving one color filter or another into position at the focal point so that the rays of light at that point may pass through it, and means for changing the direction of the light rays after they have passed through the color filter.

12. In combination, a source of light, means for condensing light rays emitted from said light at a focal point, color filters adjacent said focal point, one of which is biased to move to said focal point by gravity, contacts, and energy consuming means for operating said contacts and for moving a second filter to said focal point and maintaining it at said focal point so long as energy is being consumed.

13. In combination, a source of light, means for condensing rays of light from said source at a focal point, a plurality of color filters, contacts, means for selectively operating said contacts and moving one color filter or another into position at said focal point so that the rays of light at that point may pass through it, and means for changing the direction of the light rays after they have passed through the color filter.

14. In combination, a single source of light, means for condensing rays of light from said source at a focal point, a plurality of small and light weight color filters adjacent said focal point one of which is biased to move to said focal point by gravity, and through which the focalized rays pass, contacts, means requiring a small consumption of energy for selectively operating said contacts and moving one color filter or another into position at the focal point so that the rays of light at that point may pass through it, and means for changing the direction of the light rays after they have passed through the color filter.

15. In combination, a source of light, means for condensing light rays from said source at a focal point, color filters adjacent said focal point, means for selectively moving one filter or another into position at said focal point so that the rays of light will pass through such filters, and a device for projecting said rays in substantially parallel lines after they have passed through the filter.

In testimony whereof, I have signed my name to this specification.

ELI J. BLAKE.